(12) United States Patent
Nakanoya et al.

(10) Patent No.: US 6,309,446 B1
(45) Date of Patent: Oct. 30, 2001

(54) ACTIVATED CARBON FOR ADSORPTIVE STORAGE OF GASEOUS COMPOUND

(75) Inventors: Tsutomu Nakanoya; Yuji Shibsawa; Kazuhiro Hasumi; Koji Ishimori, all of Machida; Satoshi Ibaraki; Akira Takauchi, both of Osaka, all of (JP)

(73) Assignees: Kanebo, Ltd.; Takachibo Chemical Industry Co., Ltd., both of Tokyo (JP)

( * ) Notice: Subject to any disclaimer, the term of this patent is extended or adjusted under 35 U.S.C. 154(b) by 0 days.

(21) Appl. No.: 09/374,116

(22) Filed: Aug. 16, 1999

Related U.S. Application Data

(63) Continuation-in-part of application No. 09/023,071, filed on Feb. 13, 1998, now abandoned.

(30) Foreign Application Priority Data

| Feb. 17, 1997 | (JP) | 9-032044 |
| Jul. 15, 1997 | (JP) | 9-189551 |
| Feb. 17, 1998 | (JP) | 10-034460 |
| Feb. 17, 1998 | (JP) | 10-034461 |

(51) Int. Cl.[7] ................................. B01D 53/04
(52) U.S. Cl. ................ 95/102; 95/106; 95/133; 96/143; 96/146; 502/418; 502/430
(58) Field of Search .............. 95/95–107, 133, 95/901; 96/108, 143, 144, 146; 55/512, 522, DIG. 5; 502/416, 418, 430

(56) References Cited

U.S. PATENT DOCUMENTS

| 3,116,132 | * 12/1963 | Halter et al. ............... 95/104 |
| 4,580,404 | * 4/1986 | Pez et al. ................ 96/146 X |
| 4,744,221 | 5/1988 | Knollmueller ................ 62/48 |
| 5,118,329 | * 6/1992 | Kosaka et al. ............. 95/901 X |
| 5,270,280 | * 12/1993 | Ichikawa et al. .......... 502/418 X |
| 5,330,560 | * 7/1994 | Chao et al. .................. 95/95 |
| 5,458,784 | * 10/1995 | Baker et al. ............. 95/133 X |
| 5,461,023 | * 10/1995 | Chang et al. ............ 502/430 X |
| 5,518,528 | * 5/1996 | Tom et al. ................. 95/103 |
| 5,704,965 | * 1/1998 | Tom et al. .................. 95/95 |
| 5,707,424 | * 1/1998 | Tom et al. .................. 95/95 |
| 5,710,092 | * 1/1998 | Baker ................... 95/901 X |
| 5,761,910 | * 6/1998 | Tom ..................... 95/95 X |
| 5,837,027 | * 11/1998 | Olander et al. ........... 95/104 X |
| 5,980,608 | * 11/1999 | Dietz et al. ............. 96/144 X |
| 5,985,008 | * 11/1999 | Tom et al. .............. 96/108 X |
| 5,993,766 | * 11/1999 | Tom et al. .............. 96/108 X |

FOREIGN PATENT DOCUMENTS

| 60-247073 | 12/1985 | (JP) . |
| 61-144495 | 7/1986 | (JP) . |
| 05-337366 A | * 12/1993 | (JP) .................. 502/430 |
| 8-224468 | 9/1996 | (JP) . |
| 9-110409 | 4/1997 | (JP) . |
| 9-210295 | 8/1997 | (JP) . |
| 96/11739 | 4/1996 | (WO) . |

* cited by examiner

Primary Examiner—Robert H. Spitzer
(74) Attorney, Agent, or Firm—Pillsbury Winthrop LLP

(57) ABSTRACT

Activated carbon having a specific surface area of 700 to 1,500 m$^2$/g, a pore volume of pores having a pore diameter of 10 nm or less of 0.20 to 0.8 cc/g, a proportion of a pore volume of pores having a pore diameter of 0.6 to 0.8 nm to a pore volume of pores having a pore diameter of 10 nm or less of 75% by volume or more, a grain bulk density of 0.4 to 1.1 g/cc, a packing density of 0.30 to 0.70 g/cc, an ash content of 1.0% or less, and a tensile strength of activated carbon grains of 30 kg/cm$^2$ or more.

20 Claims, 6 Drawing Sheets

ACTIVATED CARBON FOR ADSORPTIVE STORAGE OF GASEOUS COMPOUND

This is a Continuation-in-Part of: National application Ser. No. 09/023,071 filed Feb. 13, 1998, now abandoned.

FIELD OF THE INVENTION

The present invention relates to activated carbon for adsorptive storage of a gaseous compound used for a process and an apparatus for storage and delivery of a hydrogen compound and a halogenide used in the semiconductor industry as an ion implantation gas, such as arsine, phosphine and boron trifluoride. More specifically, it relates to activated carbon for adsorptive storage of a gaseous compound for storing and delivering a gaseous compound that is excellent in safely conducting adsorptive storage of a considerable amount of the gaseous compound in a high purity for a long term.

BACKGROUND OF THE INVENTION

In industries such as the semiconductor industry, gases that are extremely toxic for human bodies, such as arsine ($AsH_3$), phosphine ($PH_3$) and boron trifluoride ($BF_3$), are widely used for various objects, such as an ion implantation process in manufacturing of semiconductors. As a typical example of such an industrial use, arsine is conveniently supplied in containers such as cylinders containing either pure arsine or a mixture of arsine and a balance gas, such as hydrogen or helium. Leakage of arsine from the cylinders is a latent source of extreme danger particularly during the transportation and shipment of the cylinders. In order to solve the problem, a method is disclosed, for example, in U.S. Pat. No. 4,744,221, in which arsine is adsorbed to zeolite, which is a porous crystalline aluminum silicate, and stored at a negative pressure. According to this method, when the arsine once adsorbed to zeolite under a negative pressure is desorbed from the zeolite in a reversible reaction and delivered to the desired location, the danger of the toxic arsine diffusing into the atmosphere can be avoided by the negative pressure.

However, as arsine adsorbed to zeolite undergoes resolving at room temperature into arsenic and hydrogen, the concentration of pure arsine that can be extracted is decreased, and with the passage of time, the internal pressure of the canister increases due to the generation of hydrogen and becomes, in some cases, a pressure higher than the atmospheric pressure, resulting in danger of arsine leaking outside.

In order to avoid such danger, PCT WO96/11739 discloses that activated carbon containing less impurities is suitable for the storage of gaseous compound used as an ion implantation gas in the semiconductor industry, such as arsine, phosphine and boron trifluoride. However, since general activated carbon is produced from natural substances, such as coconut shell and coal, when pores are formed during an activation process, which is one step in the production process of activated carbon, the pore size distribution is broadened due to the influence of impurities contained in the raw material unevenness in composition and structure of the raw material, resulting in that it is not suitable for adsorptive storage of the particular gaseous compound in a high efficiency. Furthermore, since there are lot-to-lot differences in the raw material due to the difference in production district and production season, it is difficult to strictly control the pore size distribution contributing the adsorption capacity of the gas.

When activated carbon granules packed in a container do not have sufficient strength, there is a possibility that the activated carbon granules rub against each other or against the container wall due to the pressure change on transportation of the container and on adsorption and desorption of the gaseous compound. Such rubbing brings about deterioration of the activated carbon forming fine particles of carbon in the container, and a problem arises in that the fine particles of carbon clog a gas filter through which the gaseous compound is taken out from the container.

Activated carbon originated by a natural source contains various metals as impurities. When the activated carbon is used for adsorptive storage of gaseous compound such as arsine and phosphine as impurities are contained, the adsorbed gaseous compound undergoes resolving as similar to the case where zeolite is used as the adsorbent, for example, arsine is decomposed into arsenic and hydrogen as shown in the following scheme.

$$AsH_3 \rightarrow As + 3/2 H_2$$

By this resolution, the concentration of pure arsine that can be extracted is decreased, and furthermore with the passage of time, the internal pressure of the container increases due to the generation of hydrogen, and in some cases, it rises from the initial negative pressure to a pressure higher than the atmospheric pressure, resulting in danger of an extremely toxic gas such as arsine leaking outside.

In order to avoid such danger, the purity of activated carbon is heightened by washing with an acid such as hydrochloric acid, nitric acid, phosphoric acid and sulfuric acid. However, by conducting acid washing, an anion of the substance used for the acid washing may remain in the activated carbon, and when such activated carbon is used for adsorptive storage of arsine or phosphine, nitrogen gas or oxygen gas are generated due to reduction of the anion, which brings about problems of decrease in purity of the stored gas and leakage of the gas as similar to the cases described above.

In the case where high-purity activated carbon produced from a high-purity raw material is used, the problem of resolution of arsine into arsenic and hydrogen, for example, can be solved. However, even the high-purity activated carbon reacts with a gas such as arsine to generate impurities such as hydrogen, nitrogen, carbon monoxide and carbon dioxide. The thus generated impurity gases generally do not raise the gas pressure in the storage container to a pressure exceeding the atmospheric pressure, as different from the hydrogen gas generated by the resolution of arsine, and there is less danger of leakage to the outside in this point of view. However, the required purity of arsine, phosphine and boron trifluoride, which are used for the ion implantation process in the semiconductor industry for example, is at least 99.9% according to the SEMI International Standards (1990), and the reduction in purity of these gases may greatly deteriorate the value of these gases.

In the case where the particular gaseous hydrogenated compound and halogenated compounds used for production of semiconductors, which have been stored by adsorption under temperatures of the general working circumstances, are withdrawn by a vacuum pump to be desorbed and delivered with controlling its flow amount for practical use, the gaseous compounds finally remain in the container in not a little amount, and thus the amount of the gaseous compound that can be effectively used is limited.

Gaseous organic compounds, such as methane, which attract the attention of people as an environmental friendly energy source are stored in cylinder as high pressure gas or as liquefied gas. However, as the demand of the usage of the gaseous organic compounds is increased, it will become necessary for gas providers to make the storage method of the gas much more efficient and easy to use.

SUMMARY OF THE INVENTION

As a result of earnest investigation to solve the problems described above by the inventors, the present invention has been accomplished. An object of the invention is, therefore, to provide activated carbon that effectively adsorbs a considerable amount of the particular gaseous compound, safely and stably stores the gaseous compound, and effectively delivers the gaseous compound with suppressing leakage of the gaseous compound to the atmosphere.

In the invention, activated carbon is developed, which has a specific surface area of 700 to 1,500 $m^2/g$, a pore volume of pores having a pore diameter of 10 nm or less of 0.20 to 0.80 cc/g, a proportion of a pore volume of pores having a pore diameter of 0.6 to 0.8 nm to a pore volume of pores having a pore diameter of 10 nm or less of 75% by volume or more, a grain bulk density of 0.4 to 1.1 g/cc, a packing density of 0.30 to 0.70 g/cc, an ash content of 1.0% or less, and tensile strength of activated carbon granules of 30 $kg/cm^2$ or more.

In the invention, the above-described activated carbon capable of storing and then delivering, for example, a gaseous hydrogenated compound, a gaseous halogenated compound and a gaseous organic compound such as methane is also developed. It is achieved by contacting the activated carbon with a prescribed amount of, for example, a gaseous hydrogenated compound, a gaseous halogenated compound and a gaseous organic compound such as methane, adsorbing and storing the gaseous compound under a storage circumstance at a pressure lower than the atmospheric pressure, and obtaining the gaseous compound by desorbing at least a part of the gaseous compound and delivering the gaseous compound to working circumstances by withdrawing to a negative pressure.

In the invention, specific activated carbon is also developed, which is treated by a series of steps comprising a step of adsorbing a gaseous hydrogenated compound or a gaseous halogenated compound by contacting in a sealed space, a step of accelerating an adsorption reaction of the system after the adsorption reaction, and a step of expelling the gaseous compound after the reaction accelerating step from the sealed space.

This activated carbon is capable of preventing from generating impurities when it contacts, adsorbs and stores the same kind of gaseous compound which is used in the above steps of the process or another gaseous hydrogenated compound or a gaseous halogenated compound which is not used in the process.

DETAILED DESCRIPTION OF PREFERRED EMBODIMENTS

Figure 1:
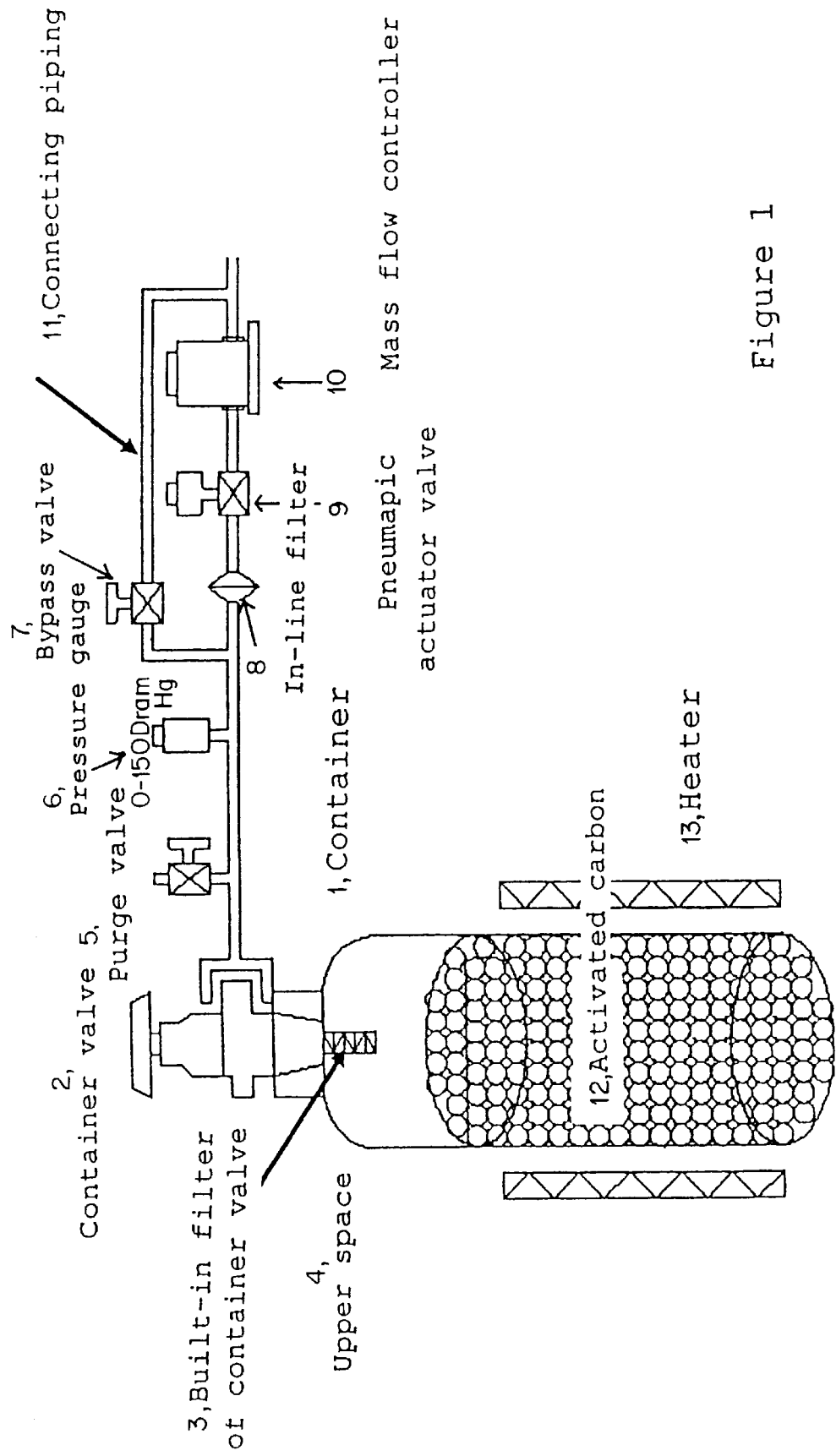
FIG. 1 is a schematic diagram of an apparatus storing a gaseous hydrogenated compound and a gaseous halogenated compound and a gaseous organic compound such as methane, and then delivering them.

FIG. 1 shows an example of an apparatus according to the invention utilizing activated carbon for storing, for example, a gaseous hydrogenated compound, a gaseous halogenated compound or a gaseous organic compound such as methane, and then delivering the gaseous compound, which is characterized in that a prescribed amount of, for example, a gaseous hydrogenated compound, a gaseous halogenated compound or a gaseous organic compound such as methane is in contact with activated carbon produced from a phenol resin as a main raw material, to store the gaseous compound by adsorption with the activated carbon under storage circumstances at a pressure lower than the atmospheric pressure. The apparatus comprises a container 1, a container valve 2, a built-in filter 3 of container valve 2, an upper space 4, a purge valve 5, a pressure gauge 6, a bypass valve 7, an in-line filter 8, pneumatic actuator valve 9, a mass flow controller 10, connecting piping 11 including the whole piping throughout the apparatus, and activated carbon 12. The connecting piping is connected to a vacuum chamber (not shown). The apparatus may further comprise a heater 13 for heating the container 1 and the activated carbon 12, and a unit (not shown) controlling the heating temperature. The container 1 and the connecting piping 11 preferably have a sufficient vacuum tightness.

The activated carbon according to the invention is used in an apparatus for storing and then delivering, for example, a gaseous hydrogenated compound, a gaseous halogenated compound or a gaseous organic compound such as methane, which is characterized in that a prescribed amount of, for example, a gaseous hydrogenated compound, a gaseous halogenated compound or a gaseous organic compound such as methane is in contact with high purity activated carbon in order to store the gaseous compound by adsorbing with the activated carbon under storage circumstances at a pressure lower than the atmospheric pressure, and then at least a part of the adsorbed gaseous compound is desorbed to deliver to the working circumstances. The activated carbon used in such an apparatus is preferably activated carbon produced from a phenol resin, which can be precisely controlled in the pore diameter and the pore volume, and is excellent in the uniformity as a raw material and the lot-to-lot uniformity. It is more preferably a granular carbon formed body comprising carbonized and activated grains of phenol resin powder bound to each other, which has a specific surface area of 700 to 1,500 $m^2/g$, a pore volume of pores having a pore diameter of 10 nm or less of 0.20 to 0.8 cc/g, a proportion of pore volume of pores having a pore diameter of 0.6 to 0.8 nm to a pore volume of pores having a pore diameter of 10 nm or less is 75% by volume or more, a grain bulk density of 0.4 to 1.1 g/cc, a packing density of 0.30 to 0.70 g/cc, an ash content of 1.0% or less, and a tensile strength of activated carbon granules of 30 $kg/cm^2$ or more.

The activated carbon is more preferably that produced from a phenol resin as a main raw material separately proposed by the inventors, which has been previously treated by a series of steps comprising an adsorbing step of previously adsorbing a gaseous hydrogenated compound or a gaseous halogenated compound by contacting in a sealed space, a reaction accelerating step of accelerating a reaction between the adsorbed gaseous compound and the activated carbon in the system, and an expelling step of expelling the gaseous compound through the reaction accelerating step from the sealed space.

The activated carbon of the invention has a specific surface area of 700 to 1,500 m$^2$/g, preferably 850 to 1,400 m$^2$/g, and more preferably 900 to 1,300 m$^2$/g. When the specific surface area is less than 700 m$^2$/g, it is not preferred since the adsorption sites for a gaseous compound such as arsine, phosphine and methane is too small, and thus the adsorption capacity is too small. When the specific surface area is more than 1,500 m$^2$/g, it is not preferred since the pore volume of pores having a pore diameter of 0.6 to 0.8 nm, which is considered to effectively function for adsorption of a gaseous compound such as arsine, phosphine and methane, becomes too small.

The activated carbon of the invention has a pore volume of pores having a pore diameter of 0.01 to 10 $\mu$m of 0.1 to 1.0 cc/g, preferably 0.2 to 0.8 cc/g, and more preferably 0.3 to 0.7 cc/g. When the pore volume of this range of pore diameter is less than 0.1 cc/g, it is not preferred since the diffusion rate of a gaseous compound such as arsine, phosphine and methane in the pores decreases, and the adsorption rate and the desorption rate are thus decreased. When the pore volume of pores having a pore diameter of 0.01 to 10 $\mu$m is more than 1.0 cc/g, it is not preferred since the grain bulk density and the mechanical strength become small.

The activated carbon of the invention has a pore volume of pores having a pore diameter of 10 nm or less of 0.20 to 0.80 cc/g, and a proportion of a pore volume of pores having a pore diameter of 0.6 to 0.8 nm to a volume of pores having a pore diameter of 10 nm or less of 75% by volume or more. The pore volume of pores having a pore diameter of 10 nm or less is preferably 0.30 to 0.70 cc/g, and more preferably 0.30 to 0.60 cc/g. When the pore volume of pores having a pore diameter of 10 nm or less becomes too small, it is not preferred since the pore volume of pores having a pore diameter of 0.6 to 0.8 nm is decreased, and the adsorption capacity of a gaseous compound such as arsine, phosphine and methane are decreased. When the pore volume of pores having a pore diameter of 10 nm or less becomes too large, it is not preferred since the proportion of the pore volume of pores having a pore diameter of 0.6 to 0.8 nm is decreased.

The proportion of a pore volume of pores having a pore diameter of 0.6 to 0.8 nm to a pore volume of pores having a pore diameter of 10 nm or less is 75% by volume or more, preferably 78% by volume or more, and more preferably 80% by volume or more. Molecules of arsine (AsH$_3$) ,phosphine (PH$_3$) and methane have longer diameter of about 0.45 nm ,0.49 nm and 0.22 nm, respectively, as a result of calculation using the van der Waals radii of the molecules. The pores that can effectively adsorb these molecules are those having a diameter slightly larger than the diameters of the molecules, which are considered to be a pore diameter of 0.6 to 0.8 nm. Pores having a too small pore diameter are not preferred since the adsorption rate of the molecules becomes small. In the case where the pore diameter is considerably larger than the size of the molecules, the desorption rate also becomes large as well as the adsorption rate, and it is not preferred as the equilibrium adsorption amount becomes small.

Therefore, when the proportion of the pore volume of pores having a pore diameter of 0.6 to 0.8 nm, which effectively function to adsorb the molecules, to the pore volume of pores having a pore diameter of 10 nm or less becomes less than 75% by volume, it is not preferred since the adsorption capacity of the gaseous compound such as arsine (AsH$_3$) ,phosphine (PH$_3$) and methane becomes small.

The activated carbon of the invention has a bulk density of 0.4 to 1.2 g/cc, preferably 0.5 to 1.0 g/cc, and more preferably 0.6 to 0.8 g/cc. In the case where the bulk density is too small, it is not preferred since the adsorption capacity per unit volume of the internal space of the container becomes small when the activated carbon is packed in the container such as a cylinder. When it is too large, it is not preferred since the open pores of the activated carbon is decreased to deteriorate the adsorption capacity.

The packing density when the activated carbon is packed in a container such as a cylinder is 0.3 to 0.7 cc/g, and preferably 0.5 to 0.65 g/cc. When the packing density is too small, it is not preferred since the adsorption capacity per unit volume of the internal space of the container such as a cylinder. The shape of the activated carbon of the invention may be a columnar or spherical form, and also those having cylinder shape or other irregular cross sections may be used.

The size of the activated carbon granules of the invention is 0.1 to 5 mm, preferably 0.2 to 4 mm, and more preferably 0.3 to 3 mm. When the grains are too large, it is not preferred since the packing density cannot be large on packing in a container such as a cylinder. When the granules are too small, it is not preferred since the workability on production of the granules and packing operation in the container becomes deteriorated. In addition to the reason above, it is not preferred since too small granules cause the pressure loss when gaseous compound is supplied into and withdrawn from a container in which the activated carbon is packed.

The activated carbon of the invention may be that obtained by subjecting the following treatments. For example, a series of steps is applied to activated carbon , which series of steps comprises a step of adsorbing a gaseous hydrogenated compound and a gaseous halogenated compound, such as arsine, phosphine and boron trifluoride, by contacting in a sealed space, a step of accelerating the reaction of the system through the reaction between the said gaseous compound and the activated carbon, and a step of expelling the gaseous compound through the reaction accelerating step from the sealed space. The reason why the series of steps is applied is that the inclusion of impurities in the gaseous compound to be stored is prevented by forcefully removing hydrogen, nitrogen, oxygen and carbon atoms present on the pore surface of the activated carbon previously. The gaseous compound previously introduced not only is physically adsorbed on the surface of the activated carbon, but also chemically reacts with hydrogen, nitrogen, oxygen and carbon atoms on the surface of the activated carbon to generate hydrogen, nitrogen, carbon monoxide and carbon dioxide, which are mingled in the previously introduced gaseous compound. Therefore, the amount of atoms, which are a cause of impurities generated by the reaction with the gaseous compound to be stored in the activated carbon , is already decreased, and the inclusion of impurities in the gaseous compound to be stored can be prevented. This method can be theoretically applied to other gaseous compounds.

The step of accelerating preferably comprises a step of heating the prescribed amount of the gaseous compound, such as arsine, phosphine and boron trifluoride, in the sealed space. The temperature at the heating step is preferably 30° C. or more, which is the temperature of the general operation circumstances of the apparatus used in the subsequent delivering, more preferably 50° C. or more, and most preferably 100° C. or more.

The time required for the heating in the reaction accelerating step greatly depends on the heating temperature. Under the condition of a heating temperature of 100° C. or more, it is preferably 1 hour or more, more preferably 5 hours or more, and most preferably 8 hours or more. When the heating time is too short, it is not preferred since the generation of impurity gases during practical storage cannot be prevented as expected due to the incomplete reaction. The conditions that require a heating time of a few days is greatly inferior in efficiency on practical operation and is not preferred.

The filling amount of the gaseous compound, such as arsine, phosphine and boron trifluoride, and/or the heating temperature are preferably selected so that the pressure in the sealed space on the expelling step becomes the atmospheric pressure or lower. Furthermore, a buffer space may be provided in the sealed space to smoothly expelling the impurity gases generated in the reaction accelerating step and mingled in the gaseous compound, such as arsine, phosphine, and boron trifluoride.

The expelling step of expelling the gas after the reaction accelerating step from the sealed space is conducted by the pressure being reduced to 10 to 5 mmHg with a vacuum pump while the temperature is maintained at 100 to 200° C. These treatments of activated carbon with the gaseous compound can be conducted for activated carbon to be packed in plural containers at once before packed in the containers, or conducted after the activated carbon is packed in the respective containers. As it is complicated that the activated carbon having been treated with extremely toxic arsine is once withdrawn from a container and then distributed to the respective containers, it is preferred in operability that the treatments with the gaseous compound are conducted for the respective containers in which the activated carbon is already packed.

The hydrogenated gaseous compound and the halogenated gaseous compound, such as arsine, phosphine and boron trifluoride, are not only physically adsorbed on the activated carbon adsorbent in the container, but also subjected to chemical adsorption associated with the reaction with hydrogen, nitrogen, oxygen and carbon atoms present on the surface of the activated carbon adsorbent. As a result, they bring about generation of hydrogen, nitrogen, carbon monoxide and carbon dioxide as impurities in the gaseous compounds, which are mingled in the gaseous compounds.

As an embodiment of this method, in the case where the hydrogenated gaseous compound and the halogenated gaseous compound, such as arsine, phosphine and boron trifluoride, are desired to be used in a short period of time, the previous treatments can be conducted in a few hours by heating to a high temperature at which the hydrogenated gaseous compound and the halogenated gaseous compound, such as arsine, phosphine and boron trifluoride, themselves are not subjected to autolysis, and the hydrogenated gaseous compound and the halogenated gaseous compound, such as arsine, phosphine and boron trifluoride, to be stored are then adsorbed. After that, the container the gaseous compounds can be transported to the working circumstances. On the other hand, in the case where there is a sufficient period of time until the gaseous compounds are used, the hydrogenated gaseous compound and the halogenated gaseous compound, such as arsine, phosphine and boron trifluoride, are put in the container the activated carbon, followed by being allowed to stand, and at the time of the use, they are substituted by the hydrogenated gaseous compound and the halogenated gaseous compound, such as arsine, phosphine and boron trifluoride, to be stored. The required amount of the hydrogenated gaseous compound and the halogenated gaseous compound, such as arsine, phosphine and boron trifluoride, used for the previous treatments is only the amount necessary for completing the reaction with the activated carbon, and there is no useless consumption of the hydrogenated gaseous compound and the halogenated gaseous compound, such as arsine, phosphine and boron trifluoride.

By suitably selecting the amount of the hydrogenated gaseous compound and the halogenated gaseous compound, such as arsine, phosphine and boron trifluoride, and/or the heating temperature, to make the pressure in the sealed space to be a pressure lower than the atmospheric pressure, it is possible to prevent leakage of the hydrogenated gaseous compound and the halogenated gaseous compound, such as arsine, phosphine and boron trifluoride, used for the previous treatments on expelling these gaseous compounds. Thus, the removal of impurities can be conducted safely.

The activated carbon that can be used for the method and the apparatus has been described in detail, in which by treating the activated carbon with a series of steps comprising a step of adsorbing a gaseous hydrogenated compound and a gaseous halogenated compound by contacting in a sealed space, a step of accelerating the reaction of the system, and a step of expelling the gaseous compound after the reaction accelerating step from the sealed space, the deterioration of the purity of the gaseous compound to be stored, which is the same as or different from the gaseous compound used for treatments, due to impurity gases generated by the contact of the activated carbon and the gaseous compound to be stored, is prevented. However, various changes and modifications can be made unless not departing from the scope and spirit of the invention.

For example, the packed amount of the activated carbon adsorbent of the invention can be suitably selected in relation to the stored amount of arsine. The gaseous compound previously made in contact with the activated carbon adsorbent in the sealed space may not be the same as the gaseous compound to be stored. For example, there is no problem in that impurities in the activated carbon adsorbent is forcefully removed by using phosphine or boron trifluoride, which are used for an ion implantation gas in a doping step of a semiconductor as well as arsine, and then arsine is introduced as a gaseous compound to be stored.

Adding a heating unit in the structure of the apparatus storing and then delivering the gaseous hydrogenated compound, the gaseous halogenated compound and a gaseous organic compound such as methane by using the activated carbon of the invention, it becomes possible to heat the storage circumstances including the activated carbon on desorption and delivering of at least a part of the gaseous hydrogenated compound and the gaseous halogenated compound used for production of semiconductors adsorbed in the container resulting in the reduction of adsorption capacity of the activated carbon by heating, so that the amount of the gaseous compound that can be delivered under the same pressure is increased. By that heating, the amount of the stored gaseous compound effectively utilized can be increased.

The heating temperature at which the storage circumstances including the activated carbon are heated to desorb and deliver at least a part of the gaseous compound is preferably 30° C., which is the temperature of the general operation circumstances of the apparatus, or more, more preferably 40° C. or more, and most preferably 50° C. or more. When the temperature is over 200° C., it is not preferred since gaseous compounds such as arsine undergoes autolysis. However, when a gaseous compound stored in the container does not cause autolysis, a temperature over 200° C. can be allowed.

Upon heating, it is preferred to use the activated carbon that has been treated by the series of steps according to the invention, which comprises the adsorption step of adsorbing the gaseous hydrogenated compound and a gaseous halogenated compound by previously contacting with them in a sealed space, the step of accelerating the reaction of the system, and the expelling step of expelling the gaseous compound after the reaction accelerating step from the sealed space.

An example of a production process of the activated carbon of the invention is described in detail below.

A phenol resin is roughly classified into a resol resin, a novolak resin, other special phenol resins, and their modified products. While the phenol resin powder used for production of the activated carbon of the invention is not particularly limited, the granular or powdery special phenol resins disclosed in Examined Published Japanese Patent Application Nos. 62-30210 and 62-30212 can be used. The summary of their production process is as follows.

Phenol or a mixture of phenol and a nitrogen-containing compound, such as urea, melamine and aniline, is added to a mixed aqueous solution of 15 to 22% by weight of hydrochloric acid and 7 to 15% by weight of formaldehyde under stirring at room temperature in an amount at a ratio of 1/15 or less of the mixed aqueous solution. The stirring operation is stopped before white turbidity is formed in the reaction system, and the system is allowed to stand. A phenol resin having a pink color in a form of granules is formed and allowed to settle in the reaction system during the standing. The whole reaction system is then heated to a temperature of 40 to 90° C. under stirring to complete the reaction, followed by washed with water. The reaction system is then neutralized with aqueous ammonia, followed by washing with water, dehydration and drying. The resulting granular phenol resin almost comprises primary granule having a granule diameter of 0.1 to 150 μm and their secondary agglomerates.

The obtained phenol resin is special phenol resin powder having different properties from a resol resin and a novolak resin, and can be used as the phenol resin powder for production of the activated carbon in the invention. The methanol solubility upon heating and refluxing in 500 ml of substantially dehydrated methanol as defined by the following formula can be used as an index of the reactivity of the phenol resin.

$$S=\{(W_0-W_1)/W_0\}\times 100$$

wherein $W_0$ represents the amount of the resin used (g), $W_1$ represents the amount of the resin remained after heating and refluxing (g), and S represents the methanol solubility of the resin (percent by weight). That is, the higher the methanol solubility is, the higher the reactivity is. In the invention, the phenol resin powder having a methanol solubility of 70% by weight or less is generally used, preferably 30% by weight or less, and more preferably 10% by weight or less.

When the methanol solubility is 70% by weight or more, the phenol resin powder has a high fusibility, and the connecting gaps among the phenol resin grains are filled due to the fusion on the heating step in the course of carbonization. Thus, the open porosity of the carbonized product is lowered, and the adsorption capacity is also lowered. In order to obtain activated carbon having a sufficient adsorption capacity, the phenol resin powder having a methanol solubility within the above-described range is required.

Examples of other production process of phenol resin powder used for producing the activated carbon of the invention include a method in which a phenol compound and an aldehyde are reacted at least in the presence of a nitrogen-containing compound to produce a condensed product, and a hydrophilic polymer compound is added to and reacted with the condensed product (described in Examined Published Japanese Patent Application No. 53-12958), and a method in which a prepolymer obtained by reacting phenol and formaldehyde in a basic aqueous solution is mixed with a protective colloid, and then they are solidified to an inert solid in the form of beads (described in Examined Published Japanese Patent Application No. 51-13491). Furthermore, phenol resin powder produced by the processes described in Unexamined Published Japanese Patent Application Nos. 61-51019, 61-127719, 61-258819, 62-272260 and 62-1748 can also be used.

A resol resin is generally produced by reacting phenol and formaldehyde under an excess aldehyde condition at a ratio of phenol to formaldehyde of 1/1 to 1/2 in the presence of a basic catalyst such as sodium hydroxide, ammonia and an organic amine. The resulting resol resin comprises monomer to trimer of phenol containing a relatively large amount of a free methylol group as a main component, and thus has high reactivity.

A novolak resin is generally produced by reacting phenol and formaldehyde under an excess phenol condition at a ratio of phenol to formaldehyde of 1/0.7 to 1/0.9 in the presence of an acidic catalyst such as oxalic acid. The resulting novolak resin comprises trimer to pentamer where phenols are connected mainly by a methylene group as a main component, and contains almost no free methylol group. Therefore, it does not have self-crosslinking property by itself and has a thermoplastic property. A hardened product of a novolak resin can be obtained by adding a crosslinking agent such as hexamethylenetetramine, which is a formaldehyde generator and an organic base generator, or by adding a solid acidic catalyst and paraformaldehyde, followed by reacting under heating.

The resol resin and the novolak resin can be used as a raw material resin powder in the invention after once hardened and then pulverized.

The particle size of the phenol resin powder used for producing the activated carbon of the invention is generally 0.1 to 150 μm, preferably 0.5 to 50 μm, and most preferably 1 to 30 μm.

A binder used in the production of the activated carbon of the invention is not particularly limited, and a liquid thermosetting resin, polyvinyl alcohol (PVA) and creosote oil are preferably used.

Examples of the liquid thermosetting resin include a liquid resol resin, a liquid melamine resin and their modified resins.

The liquid resol resin can be produced by reacting phenol with an excess amount of aldehyde in the presence of a basic catalyst as described above. It comprises monomer to trimer of phenol containing a relatively large amount of a free methylol group.

The liquid melamine resin is a so-called thermosetting resin. The reaction of the liquid melamine resin is accelerated by heating, and it finally becomes a hardened product that is not soluble or fusible through the form of a hydrophilic initial polymerized product and the form of a hydrophobic condensed product where the condensation reaction somewhat proceeds.

The liquid melamine resin is produced by adding an aldehyde, generally formaldehyde, to melamine. Various alcohols may sometimes be used at the same time. In the formation reaction of a melamine resin, formaldehyde is firstly added to melamine as a methylol group, and the formation proceeds by a reaction where the methylol group is subjected to dehydration condensation with an amino group or an imino group of other molecules to form a methylene group, a reaction where the methylol groups are subjected to dehydration condensation to form a dimethylene ether bond, and a reaction where dehydration occurs between the methylol group and an alcohol to form an ether.

The liquid melamine resin can be classified into a water-soluble resin and an oil-soluble resin. The water-soluble resin is generally produced by using methanol as the alcohol. The oil-soluble resin is also called a butylated melamine resin, and is generally produced by using butanol as the alcohol.

The liquid melamine resin used as a binder for producing the activated carbon of the invention may be either water-soluble or oil-soluble, and those produced by known processes can be used.

The polyvinyl alcohol used for producing the activated carbon of the invention preferably has a polymerization degree of 100 to 5,000 and a saponification degree of 70% or more, and those modified by a carboxyl group are also preferably used.

In the production of the activated carbon of the invention, a granular product is obtained by mixing the phenol resin powder and the binder component, followed by granulation. The content of the binder in the invention is 5 to 90 parts by weight per 100 parts by weight of the phenol resin powder.

The content of the binder is preferably 10 to 60 parts by weight, more preferably 20 to 40 parts by weight. When the content of the binder is less than 5 parts by weight, the workability on granulation is lowered to make extrusion from dies difficult, resulting in problems occur in that the granulated product is not uniform in their shape and is low in strength, and powder is liable to be generated. When it is more than 90 parts by weight, it is not preferred since the workability is lowered, and the connectivity of pores in pellets after carbonization and activation is lowered to deteriorate the performance as an adsorbent.

The mixing of the phenol resin powder and the binder component can be conducted by using a commercially available mixing and stirring machine, such as a ribbon mixer, a twin-cylinder mixer, a cone mixer and a kneader, at room temperature or under heating.

In the production of the activated carbon of the invention, there is no limitation in adding other additives than the phenol resin and the binder component, and for example, starch, crystalline cellulose powder, methylcellulose, water and a solvent may be added in a suitable amount. The addition of a small amount of coke and coconut shell is also not limited.

In the production of the activated carbon of the invention, a small amount of a surface active agent, such as ethylene glycol, polyoxyethylene alkylether, polyoxyethylene fatty acid ester and ammonium polycarboxylic acid salt, a crosslinking agent for polyvinyl alcohol, and a plasticizer for extrusion granulation may be added if the properties of the activated carbon is not deteriorated.

In the production of the activated carbon of the invention, the phenol resin powder and the binder component thus uniformly mixed by a mixing apparatus is formed into a granular product. The forming into a granular product can be conducted by using, for example, a uniaxial or biaxial wet extrusion granulater, a vertical granulater such as a basket granulizer, a semidry disk pelletter. The forming is generally conducted at room temperature, and may be conducted under heating. The resulting granulated product is dried at a temperature range of about 50 to 400° C. to obtain a granular formed product.

The shape of the granular formed product is generally a columnar or spherical pellet, and is so adjusted that the shape of the pellet after carbonization and activation becomes the desired shape.

In the production of the activated carbon of the invention, the resulting granular formed product or a carbonized product obtained by subjecting the granular formed product to a heat treatment under a non-oxidation atmosphere at a temperature of 500 to 900° C. is subjected to an activation treatment at a temperature range of 700 to 1,100° C. to a weight loss of 5 to 40% based on the carbonized product, to obtain the objective activated carbon.

In the production of the activated carbon of the invention, the carbonization of the granular formed product before the activation treatment is conducted by using an electric furnace or an external heating gas furnace under a non-oxidation atmosphere at a temperature of 500 to 900° C. The non-oxidation atmosphere used herein is an atmosphere of, for example, nitrogen, argon and helium.

The carbonization temperature is generally 500 to 900° C., preferably 550 to 850° C., and more preferably 600 to 800° C. When the carbonization temperature is higher than 900° C., it is not preferred since the activation rate in the subsequent activation treatment step becomes low, and the activation cannot be conducted effectively. When the carbonization temperature is lower than 500° C., it is not preferred since the carbonization is difficult to proceed due to the too low temperature.

For producing the activated carbon of the invention, the granular formed product or the carbonized product obtained by heat treating the granular formed product in a non-oxidation atmosphere at a temperature of 500 to 900° C. is subjected to the activation treatment. The temperature range for the activation treatment is 700 to 1,100° C., preferably 800 to 1,000° C., and more preferably 850 to 950° C. When the temperature on the activation treatment is higher than 1,100° C., it is not preferred since the pore volume is reduced by thermal shrinkage, or the surface of the activated carbon is oxidized to reduce the abrasion resistance. When it is lower than 600° C., it is not preferred since the activation is not sufficiently conducted to reduce the adsorption capacity.

In the activation treatment in the production of the activated carbon of the invention, oxygen, carbon dioxide, steam, a mixed gas of these gases, an atmospheric gas such as nitrogen, argon and helium containing these gases, or a combustion waste gas of methane, propane and butane can be used. The activation is conducted to a weight loss based on the carbonized product of 5 to 40%.

When the weight loss is less than 5%, it is not preferred since the development of pores is insufficient, and the sufficient performance cannot be obtained due to the too small pore volume. When the weight loss is more than 40%, it is not preferred since the proportion of the pores having a pore diameter of 0.6 to 0.8 nm, which effectively function for adsorption of the gaseous compound such as arsine, phosphine and methane, is decreased, and also the bulk density becomes small to reduce the amount of the adsorption sites that effectively function per unit volume when the activated carbon is packed in a container such as a cylinder.

The activated carbon of the invention is, for example, packed in a container such as a cylinder in a gas manufacturing factory, and a gaseous compound used as an ion implantation gas in the semiconductor industry, such as arsine, phosphine and boron trifluoride, and a gaseous organic compound used for various fuels, such as methane, are adsorbed to stably store the gaseous compounds until they are used. At the location of manufacture of a semiconductor, the gaseous compounds are taken out from the container by withdrawing to a negative pressure on demand. Because the interior of the container is maintained at a pressure below the atmospheric pressure, the danger of extremely toxic arsine and phosphine leaking out from the container to the environmental circumstances is extremely small. Organic gaseous compounds such as methane which are used as fuel in various situation are absorbed and stored in the container very efficiently, and it contributes greatly to compacting of apparatus and decreasing of the pressure of apparatus.

Examples of the gaseous compound to be subjected to adsorptive storage by the activated carbon of the invention include gaseous compounds selected from the group consisting of arsine, phosphine, boron trifluoride, boron trichloride, tungsten hexafluoride, silane, diborane, chlorine, $B_2D_6$, $(CH_3)_3Sb$, hydrogen fluoride, hydrogen chloride, hydrogen iodide, germane, ammonia, stibine, hydrogen sulfide, hydrogen selenide, hydrogen telluride, $NF_3$, methane, ethane, propane, n-butane and i-butane. The most suitable compounds for the adsorptive storage are arsine, phosphine, boron trifluoride and methane.

The measurement methods and the evaluation methods used in the examples are described below.

(1) Measurement method for the amount of adsorbed arsine and the amount of released arsine A test container made of stainless steel having an inner diameter of 30 mm, a length of 150 mm and an internal volume of 100 ml equipped with a diaphragm cut-off valve at one end is previously weighed by a chemical balance. The weight of the test container is designated W0. After packing an adsorbent to be tested in the test container, the test container is connected to a vacuum pump via the cut-off valve and is drawn to vacuum. After gradually heating from the outside of the test container to a temperature of the interior of the test container of 350° C. by a heating device, the interior of the test container is further drawn to vacuum to a pressure of 0.01 mmHg or less. The test container is then allowed to cool to ordinary temperature and then again weighed. The weight of the test container at this time is designated W1.

While the test container is maintained at a constant temperature of 20° C. by an incubator, and the inner pressure of the test container is controlled to 700 mmHg, which is lower than the atmospheric pressure, arsine is introduced in the test container via the cut-off valve to a level that no more arsine can be adsorbed. The weight of the test container at this time is designated W2.

A quantitative analysis is conducted by connecting the test container to a gas chromatography mass analyzer via a pressure gauge, a flow amount controller and a vacuum pump. The pressure gauge is provided to measure the inner pressure when the interior of the test container is drawn to vacuum by the vacuum pump. The flow amount controller is provided to control the flow amount of the released arsine flowing from the test container. While controlling the flow amount of the released arsine to the range of 1 to 10 ml/min, the inner pressure is reduced to 20 mmHg by the vacuum pump to deliver the arsine from the test container to the outside. The test container is then again weighed, and the weight of the test container at this time is designated W3.

The interior of the test container is drawn to 0.01 mmHg by the vacuum pump and then heated by the heating device. The temperature of the interior of the test container is maintained at a temperature of 100 to 150° C. for 4 hours, and then the test container is weighed. The weight of the test container at this time is designated W4. The released amount of arsine is determined by W2–W3 and W2–W4, and the residual amount of arsine is determined by W3–W1 and W4–W1.

(2) Measurement method for pressure change after 20 days

An adsorbent to be tested is packed in a test container made of stainless steel having an inner diameter of 30 mm, a length of 150 mm and an internal volume of 100 ml equipped with a diaphragm cut-off valve at one end, which is connected to a vacuum pump via the cut-off valve. After gradually heating from the outside of the test container to a temperature of the interior of the test container of 350° C. by a heating device, the interior of the test container is further drawn to vacuum to a pressure of 0.01 mmHg or less. The test container is then allowed to cool to ordinary temperature.

While the test container is maintained at a constant temperature of 20° C. by an incubator, and the inner pressure of the test container is controlled to 700 mmHg, which is lower than the atmospheric pressure, arsine is introduced in the test container via the cut-off valve to a level that no more arsine can be adsorbed. The weight of the test container at this time is designated W0.

The test container is maintained at 20° C., and the weight of the test container after 20 days is measured. The weight of the test container at this time is designated W1. The value of W1–W0 is calculated to confirm that there is no difference due to leakage, and the inner pressure is measured.

(3) Measurement method for amount of adsorbed arsine under plural pressures

A test container made of stainless steel having an inner diameter of 30 mm, a length of 150 mm and an internal volume of 100 ml equipped with a diaphragm cut-off valve at one end is previously weighed by a chemical balance. The weight of the test container is designated W0.

After packing an adsorbent to be tested in the test container, the test container is connected to a vacuum pump via the cut-off valve and is drawn to vacuum to 0.01 mmHg or less.

After gradually heating from the outside of the test container to a temperature of the interior of the test container of 350° C. by a heating device, the interior of the test container is further drawn to vacuum to a pressure of 0.01 mmHg or less. The test container is then allowed to cool to ordinary temperature and then again weighed. The weight of the test container at this time is designated W1.

While the test container is maintained at a constant temperature of 25° C. by an incubator, and the inner pressure of the test container is controlled to 10, 20, 30, 50, 100, 200, 300, 400, 500, 600 or 700 mmHg, which are lower than the atmospheric pressure, arsine is introduced in the test container via the cut-off valve to a level that no more arsine can be adsorbed. The weight of the test container at this time is designated Wn, where n is an integer of 2 to 11 in the order of from the lower pressure to the higher pressure. The amount of adsorbent and the adsorbed amount of arsine are determined by W1–W0 and Wn–W1, respectively. ps (4) Measurement method for tensile strength of grains The tensile strength of the granule of the activated carbon is measured by a Kiya-type hardness tester. The tensile strength is calculated by the following equation the fracture load of granule, the granule diameter and the granule length.

Tensile strength: $\sigma(kg/cm^2)=2P/(\pi dl)$

P: load (kg)

d: granule diameter (cm)

l: granule length (cm)

(5) Measurement method for specific surface area of activated carbon

About 0.1 9 of the activated carbon to be measured is precisely weighed and put in a cell for a high precision full-automatic gas adsorption apparatus BELSORP 28 (manufactured by Nippon Bel Co., Ltd.). Nitrogen is adsorbed by the activated carbon by using the apparatus, and the specific surface area is measured by the BET method.

(6) Measurement method for pore volume

The measurement of the pore volume of the adsorbent of the invention in the pore diameter range of 0.01 to 10 $\mu$m is conducted by a mercury penetration method using a porosimeter (Poresizer 9310 manufactured by Shimadzu Corp.), and the measurement of the pore volume of pores having a pore diameter of 10 nm or less is conducted by a nitrogen adsorption measurement using a full-automatic gas adsorption apparatus (BELSORP 28 manufactured by Nippon Bel Co., Ltd.). Specifically, the pore volume of the pore diameter of 2 to 10 nm is obtained from D-H analysis of an adsorption isotherm of nitrogen gas at 77 K, and the pore volume of the pore diameter of 2 nm or less is obtained from a t-plot of an adsorption isotherm of nitrogen gas at 77 K by an MP method.

(7) Measurement method for ash content

About 1 g of the specimen dried at 105° C. for 2 hours is precisely weighed in a platinum crucible and ashed at 700° C. for 2 hours. The specimen is again precisely weighed to obtain the ash content.

The invention will be described in more detail below with reference to the examples, but the invention is not construed as being limited to the examples.

EXAMPLE 1

To 100 parts by weight of phenol resin powder (Belpearl R800, average grain diameter: 20 μm, produced by Kanebo, Ltd.), the prescribed amounts of a melamine resin aqueous solution (Sumitec Resin M-3, solid concentration: 80% by weight, manufactured by Sumitomo Chemical Industries, Ltd.), a polyvinyl alcohol (abbreviated as PVA hereinafter) having a polymerization degree of 1,700 and a saponification degree of 99% were added, and further the prescribed amounts of potato starch, a surface active agent (Leodole SP-L10, manufactured by Kao Corp.) and water were added.

Among the above raw materials, the phenol resin powder and the potato starch were dry mixed by a kneader for 15 minutes. The polyvinyl alcohol was dissolved in warm water to form an aqueous solution having a concentration of 15% by weight, and the resulting polyvinyl alcohol aqueous solution, the melamine resin aqueous solution, the surface active agent and water were added to the kneader, followed by kneading for further 15 minutes.

The resulting mixture composition was extruded by a biaxial extruder (Peleterdouble EXDF-100, manufactured by Fuji Paudal CO., Ltd.), to conduct granulation of pellet formed bodies of an outer diameter of about 1.0 mm having the different contents for each binder. The compositions of the raw materials are shown in Table 1.

TABLE 1

|  | Binder | | | | | Additive | | | |
|---|---|---|---|---|---|---|---|---|---|
|  | Phenol resin | Melamine solid content | PVA solid content | Total amount of binder | Starch | Surface active agent | Total water content | Total solid content | Total liquid content |
| Composition ratio | 100 | 2 | 4 | 6 | 8 | 23 | 20 | 114 | 43 |

The resulting specimen was carbonized by heating to 650° C. at a temperature rising rate of 50° C./hr and maintaining at that temperature for 1 hour by using a cylindrical electric furnace having an inner diameter of 70 mm in a nitrogen atmosphere. 20 g of the resulting carbonized product was activated with steam under different conditions to obtain seven samples. That is, they are activated by using nitrogen gas containing steam (activation gas molar ratio: $N_2/H_2O$: 1/1, flow amount: 1.0 NL/min) at 750° C. for 1.5 hours for sample 1, at 900° C. for 1.5 hours for sample 2, at 950° C. for 1.5 hours for sample 3, at 980° C. for 1.5 hours for sample 4, at 1,000° C. for 1.5 hours for sample 5, at 1,000° C. for 2.0 hours for sample 6, and at 700° C. for 1.5 hours for sample 7. The activation conditions and properties of the resulting carbonized activated products are shown in Table 2.

TABLE 2

|  | | | | | Properties of activated carbon | | | | | | |
|---|---|---|---|---|---|---|---|---|---|---|---|
|  | | | | | Pore properties | | | | | | |
| Sample | Activation temperature (° C.) | Activation time (hr) | Weight decrease rate (%) | Specific surface area ($m^2/g$) | Pore volume of 0.01–10 μm (cc/g) | Pore volume of 10 nm or less (cc/g) | Pore volume of 0.6–0.8 nm (cc/g) | Proportion of 0.6–0.8 nm (%) | Strength property Tensile strength ($kg/cm^2$) | Packing density (g/cc) | Bulk density (g/cc) |
| Sample 1 invention | 750 | 1.5 | 22 | 856 | 0.286 | 0.368 | 0.339 | 92 | 56 | 0.68 | 0.93 |
| Sample 2 invention | 900 | 1.5 | 31 | 1,074 | 0.273 | 0.480 | 0.374 | 78 | 83 | 0.59 | 0.70 |

TABLE 2-continued

| | | | | | Properties of activated carbon | | | | | | |
| | | | | | | Pore properties | | | | | |
| Sample | Activation temperature (° C.) | Activation time (hr) | Weight decrease rate (%) | Specific surface area (m²/g) | Pore volume of 0.01–10 μm (cc/g) | Pore volume of 10 nm or less (cc/g) | Pore volume of 0.6–0.8 nm (cc/g) | Proportion of 0.6–0.8 nm (%) | Strength property Tensile strength (kg/cm²) | Packing density (g/cc) | Bulk density (g/cc) |
|---|---|---|---|---|---|---|---|---|---|---|---|
| Sample 3 invention | 950 | 1.5 | 37 | 1,248 | 0.350 | 0.605 | 0.472 | 78 | 45 | 0.56 | 0.58 |
| Sample 4 invention | 980 | 1.5 | 41 | 1,460 | 0.390 | 0.607 | 0.473 | 78 | 40 | 0.48 | 0.44 |
| Sample 5 comparison | 1,000 | 1.5 | 47 | 1,770 | 0.477 | 0.820 | 0.459 | 56 | 27 | 0.38 | 0.31 |
| Sample 6 comparison | 1,000 | 2.0 | 64 | 2,143 | 0.571 | 1.100 | 0.055 | 5 | 6 | 0.29 | 0.28 |
| Sample 7 comparison | 700 | 1.5 | 18 | 675 | 0.261 | 0.287 | 0.235 | 82 | 66 | 0.74 | 0.92 |

The adsorbed amounts and released amounts of arsine for these samples of activated carbon are shown in Table 3.

TABLE 3

| | Ash content (%) | Adsorbed amount of arsine (g) | Released amount of arsine (g) | Increasing ratio of inner pressure after 20 days* (%) |
|---|---|---|---|---|
| Sample 1 invention | 0.6 | 33.1 | 19.4 | 100 |
| Sample 2 invention | 0.5 | 36.0 | 21.8 | 100 |
| Sample 3 invention | — | 35.6 | 21.5 | — |
| Sample 4 invention | — | 35.7 | 21.4 | — |
| Sample 5 comparison | — | 28.4 | 17.8 | — |
| Sample 6 comparison | — | 27.7 | 13.3 | — |
| Sample 7 comparison | — | 25.5 | 16.4 | — |
| General activated carbon comparison | 4.2 | 25.5 | 16.1 | 129 |

Samples 1 to 4 have the properties falling within the scope of the activated carbon used in the invention, and exhibit high adsorbed arsine amounts and high released arsine amounts.

In samples 5 to 7, on the other hand, at least one of the specific surface area, the pore volume pores having a pore diameter of 10 nm or less, the proportion of the pore volume of pores having a pore diameter of 0.6 to 0.8 nm, the tensile strength, the grain bulk density and the grain packing density is outside the scope determined in the invention, and the adsorbed arsine amount and the released arsine amount are lowered.

The change in inner pressure is also shown in Table 3 for sample 1, sample 2 and general coconut shell activated carbon for gas adsorption (general activated carbon ). It was found from the results that the ash content becomes large and the inner pressure is increased when the general activated carbon is used, but the ash content is small and the inner pressure is not increased for samples 1 and 2 within the scope of the activated carbon used in the invention.

EXAMPLE 2

In Example 2, comparative experiments were conducted, in which sample 2 prepared in Example 1 had not been pre-treated or had been pre-treated by contacting with arsine or phosphine (called as preliminary arsine or phosphine hereinafter) in a sealed space at various heating temperatures, and then arsine or phosphine to be stored was introduced into test containers to measure the change in inner pressure and the change in purity of the stored arsine or phosphine with the lapse of time.

Figure 2:
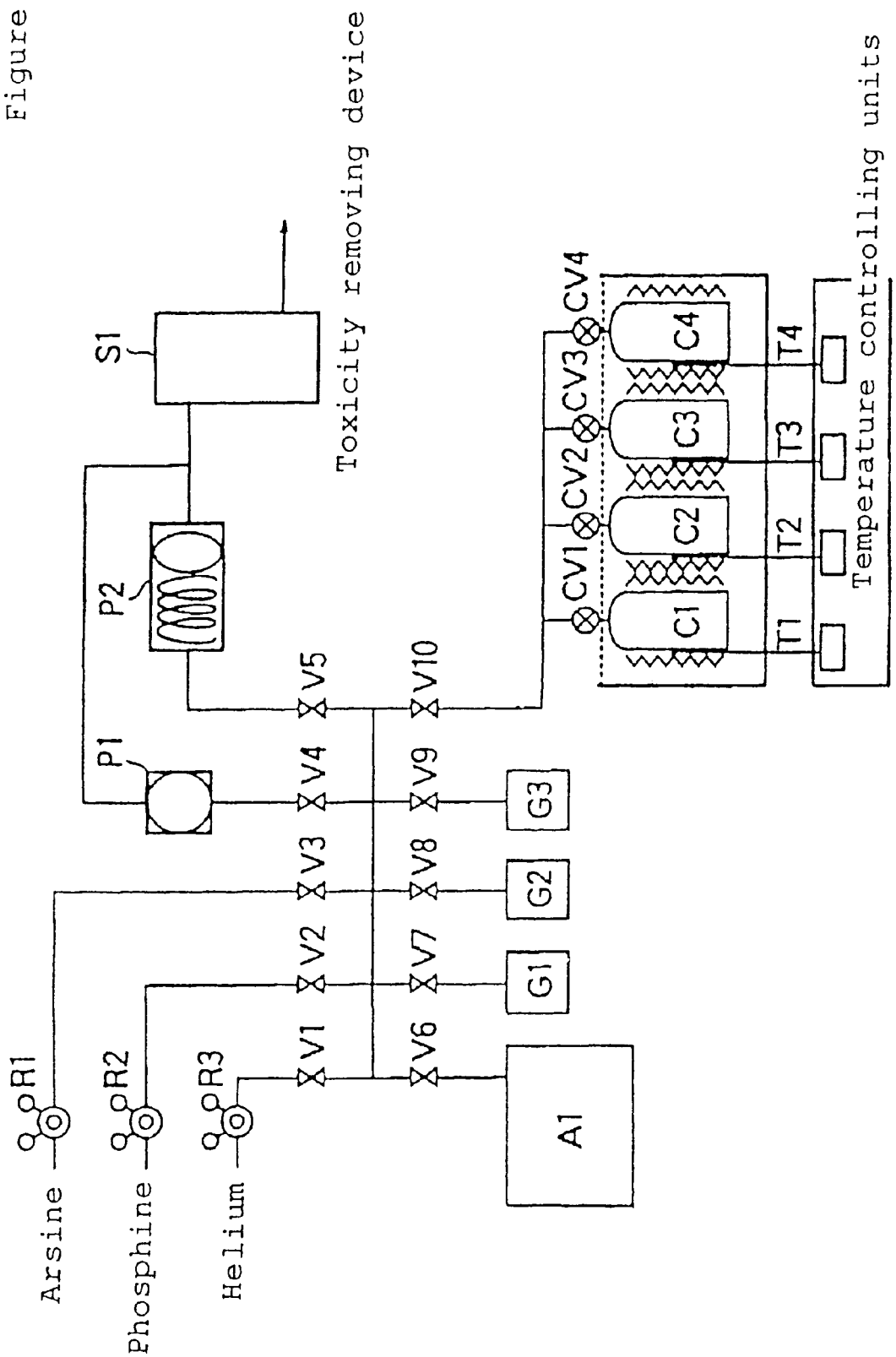
FIG. 2 is a schematic diagram of an experimental apparatus used in the example according to the invention.

FIG. 2 shows a schematic diagram of the experimental apparatus used. The experimental apparatus comprises a gas introduction system, a gas expelling system, a gas analysis system and a test container system, and the systems are connected to each other via piping equipped with normally closed cut-off valves V1 to V10. The gas introduction system is connected independently from the gas sources R1 to R3 of arsine, phosphine and helium to the test container system via the cut-off valves V1 to V3, respectively. The gas expelling system is connected from the test container system to a toxicity removing device S1 via a vacuum pump P1 and a molecular turbo pump P2, so that extremely toxic arsine and phosphine can be safely expelled outside. The gas analysis system comprises an ordinary gas analyzer A1 using gas chromatography, a pressure gauge G1, a Pirani vacuum gauge G2, and an ionization vacuum gauge G3 (the former is used for measurement of the order of $10^{-1}$ mmHg, and the latter is used for measurement of the order of $10^{-5}$ mmHg), which are connected to each of test containers via the cut-off valves V6 to V10, respectively.

The test container system comprises four test containers C1 to C4 having inlet and outlet cut-off valve CV1 to CV4 at their inlet and outlet ports, and electric heater units for heating the interior of the test containers from the outside of the test containers. The electric heater units have temperature controlling units having thermocouple sensors T1 to T4. Sample 2 is packed in each of the test containers as an adsorbent. The packed amount is such an extent that a buffering space can be provided in a sealed space at the upper part of the inlet side of the test containers.

(1) Initial vacuum treatment step

In order to clarify that impurities was originated from the reaction of arsine or phosphine with an adsorbent, an initial vacuum treatment step was conducted to remove oxygen, nitrogen and water from the test container and sample 2, which were exposed to air. The inlet and outlet cut-off valves CV1 to CV4 and the cut-off valve V4 were opened, and the interior of the test containers was drawn to a vacuum degree of 0.1 mmHg by the vacuum pump P1 to remove air from the interior of the test container, followed by closing the cut-off valve V4.

The cut-off valve V1 was opened to introduce helium, an inert gas, from the gas source R3 to the test containers at substantially the atmospheric pressure, and then the cut-off valve V1 was closed. The cut-off valve V4 was then opened, and the interior of the test containers was drawn to a vacuum degree of 0.1 mmHg. Since the helium is effective to accelerate the substitution of air in the test containers, helium may be introduced to several times. After introducing helium with the cut-off valve V1 opened, the helium gas may be introduced to the analyzer A1 via the cut-off valve V6 for analysis, so as to confirm there is no generation of oxygen, nitrogen, carbon monoxide and carbon dioxide as impurities. It has been confirmed that while helium is adsorbed on sample 2 by the helium introduction, there is no generation of impurities by that adsorption.

The test containers were heated to a prescribed temperature of 300 to 350° C. by the electric heater units with drawing to vacuum. When the vacuum degree reaches about 0.1 mmHg, it was drawn to high vacuum of $10^{-5}$ mmHg or less by the molecular turbo pump P2, with the cut-off valve V4 closed and the cut-off valve V5 opened. Finally, the inlet and outlet cut-off valves CV1 to CV4 and the cut-off valve V5 were closed to complete the initial vacuum treatment step. The test containers were allowed to stand to ordinary temperature, and then the weights of each of the test containers W0 were measured.

(2) Introduction step of preliminary arsine (phosphine)

While maintaining the test containers C1 to C4 at 20° C., preliminary arsine or preliminary phosphine was introduced into the interior of the test containers to a pressure of about 20 mmhg by using the pressure gauge G1, with the cut-off valves CV1 to CV4 and the cut-off valve V2 or V3 opened and the cut-off valve V7 opened. At this time, the temperatures of the interior of the test containers were maintained by the temperature controlling units at 50° C., 100° C., 150° C. and 200° C., in this order of from the test containers C1 to C4.

In order to measure impurities generated in the test containers and the pressure, the test containers were appropriately connected to the analyzer A1 or the pressure gauge G1. While maintaining the test containers C1 to C4 containing the preliminary arsine (phosphine) to 200° C., they were drawn to a vacuum degree of $10^{-5}$ mmHg by the vacuum pump P1 and the molecular turbo pump P2. The preliminary arsine (phosphine) containing impurities stayed in the buffering space provided at the upper part, and thus its expelling could be smoothly conducted. The test containers were allowed to stand to ordinary temperature, and then the weights of each of the test containers W1 were measured.

(3) Adsorption step of arsine (phosphine) to be stored

While maintaining the test containers C1 to C4 at 20° C., arsine or phosphine to be stored was introduced into the interior of the test containers to a pressure of about 400 mmHg by using the pressure gauge G1, with the cut-off valves CV1 to CV4 and the cut-off valve V2 or V3 opened and the cut-off valve V7 opened, so as to be adsorbed by sample 2 in the test containers. After confirming that there was no generation of impurities in the test containers by the analyzer A1, the inlet and outlet cut-off valves CV1 to CV4 were closed, and the weights of the test containers W2 were measured to calculate the weights of gas in the test containers W2–W1.

(4) Results of experiments

Figure 3:
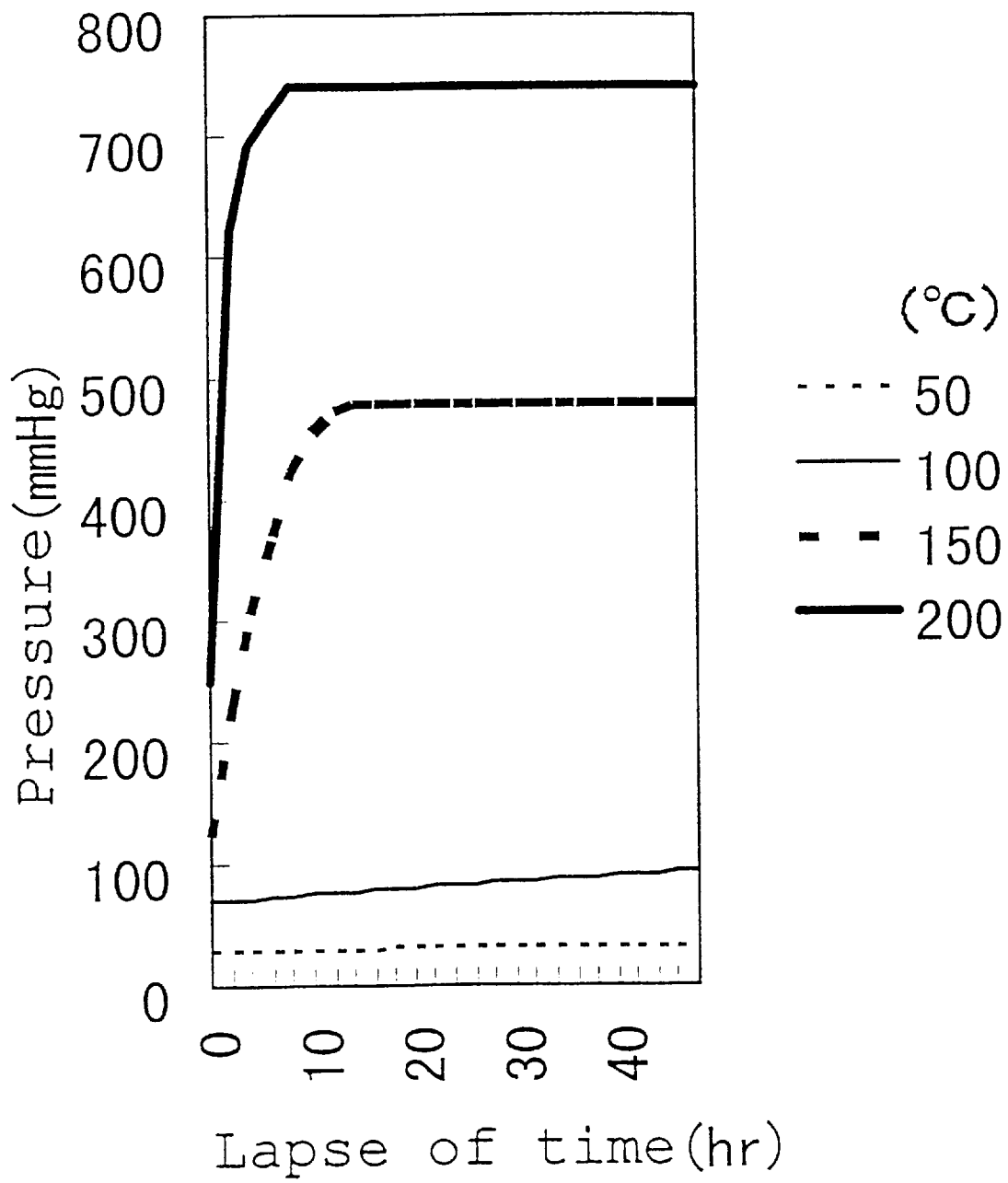
FIG. 3 is a graph showing the inner pressure of the test containers of the experimental apparatus of FIG. 2 with the lapse of time, where the pre-treatment is conducted according to the invention using arsine as an ion implantation gas at various heating temperatures.
Figure 4:
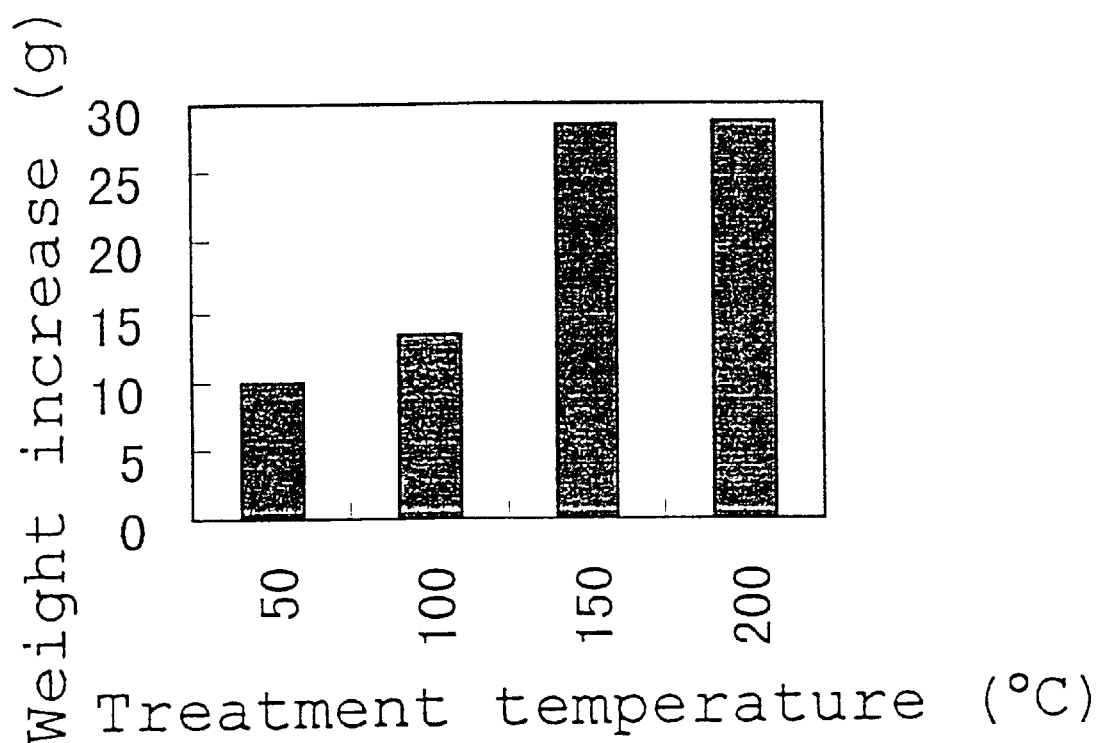
FIG. 4 is a bar graph showing the weight increase of the test containers containing the activated carbon after 48 hours in FIG. 3 against the initial weight of the test containers containing the activated carbon
Figure 5:
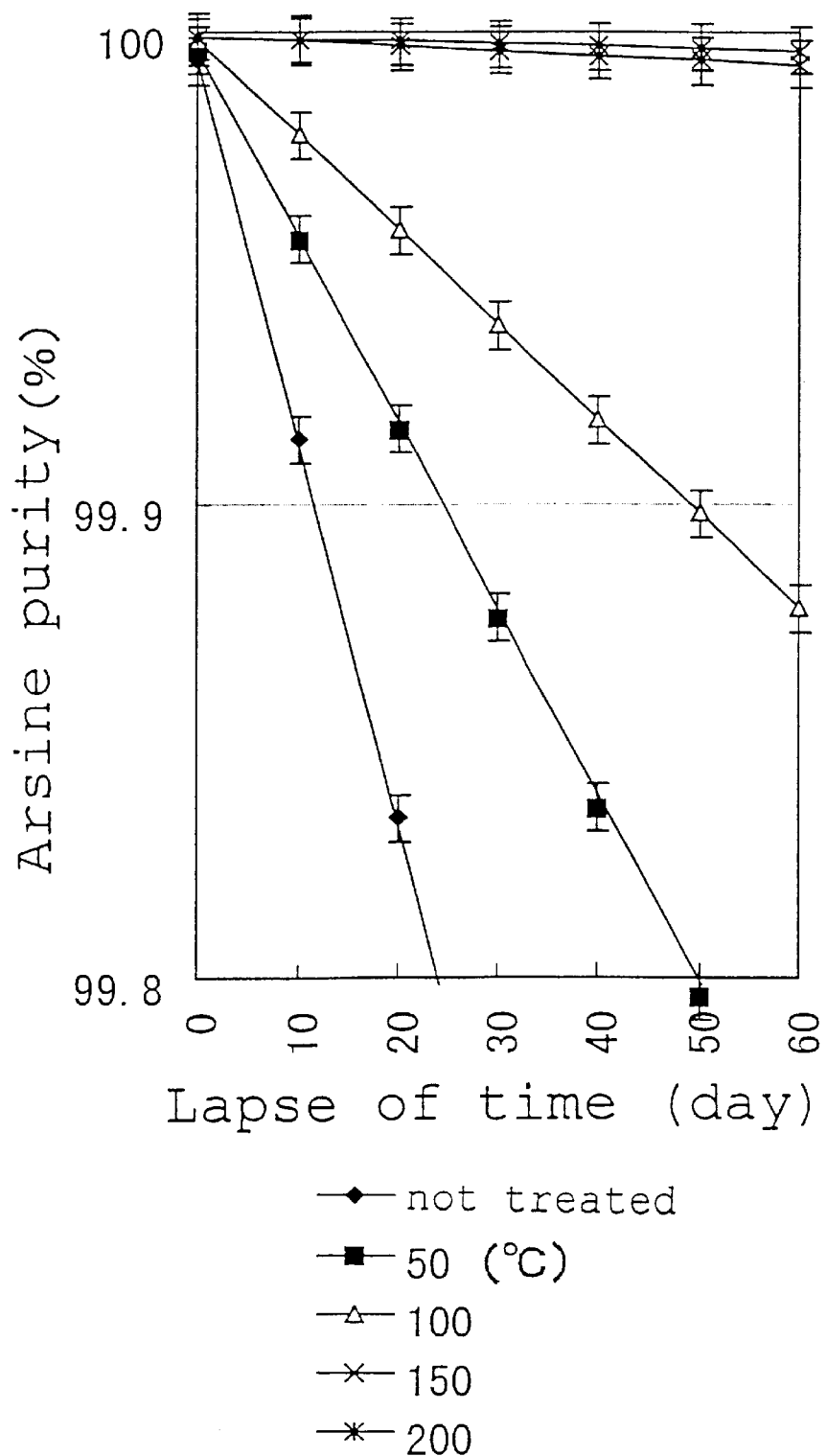
FIG. 5 is a graph showing the change in purity of the arsine to be stored when the arsine is introduced into the test containers after conducting the pre-treatment according to the invention at various heating temperatures.
Figure 6:
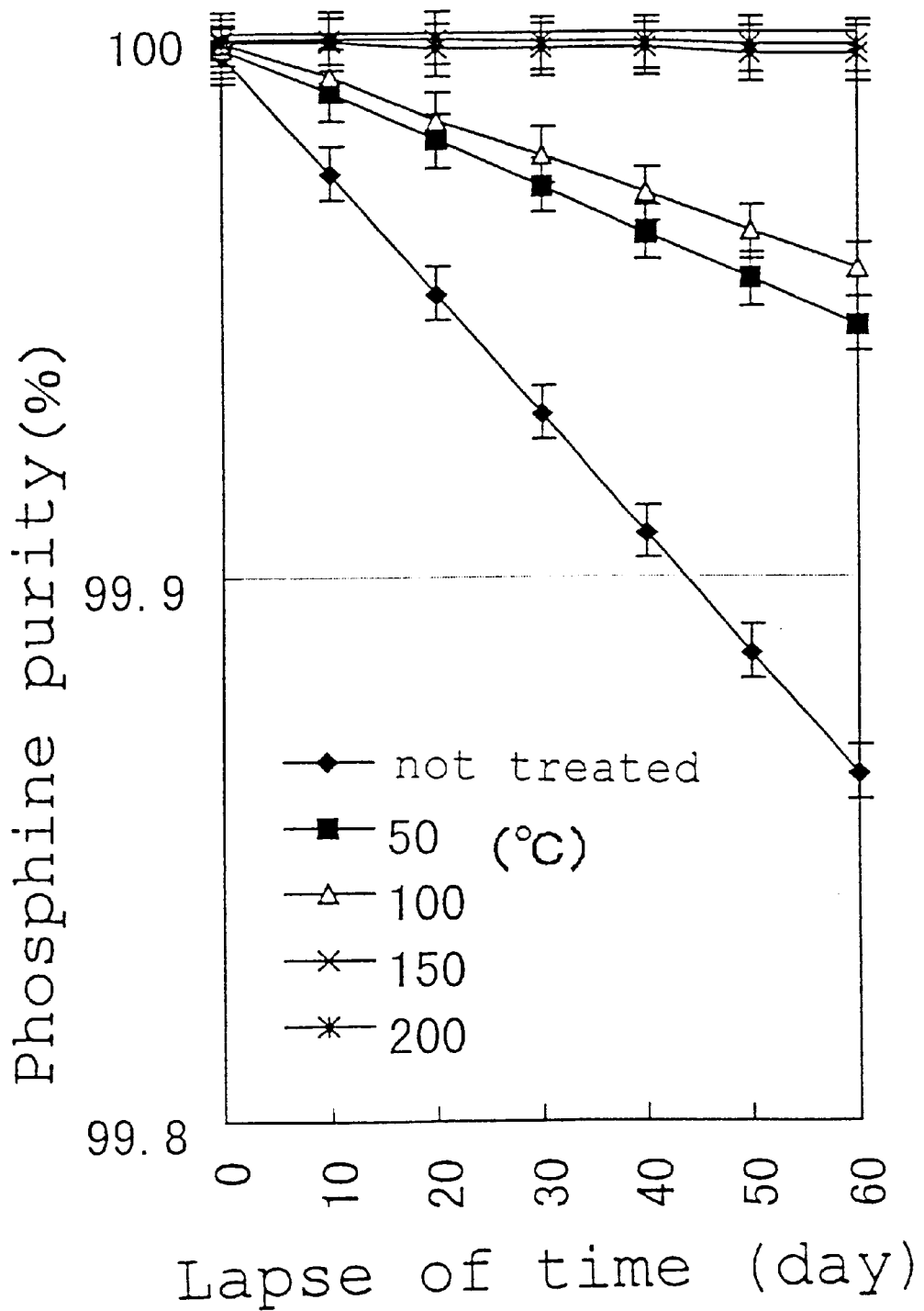
FIG. 6 is a graph showing the change in purity of the phosphine to be stored when the phosphine is introduced into the test containers after conducting the pre-treatment according to the invention at various heating temperatures.

The results of experiments in the case where arsine is used as the gaseous compound are shown in FIGS. 3 to 5, and the results in the case where phosphine is used are shown in FIG. 6.

In the relationship to the introduction step of the preliminary arsine (phosphine) (2) above, FIG. 3 is a graph showing the inner pressure of the test containers of the experimental apparatus of FIG. 2 with the lapse of time, where the pre-treatment is conducted according to the invention at various heating temperature.

It was clear from FIG. 3 that in the case where the heating temperature was 50° C. or 100° C., the inner pressure of the test containers gradually increased and reached about 33 mmHg or 93 mmHg, respectively, after 48 hours from the start of heating. It is expected that the pressure further gradually increases with the lapse of time. In the case where the heating temperature was 150° C. or 200° C., the inner pressure of the test containers abruptly increased immediately after the start of treatment, and the increase of the pressure was substantially terminated after about 14 hours from the start of treatment for 150° C. or after about 8 hours from the start of treatment for 200° C., to be a constant value of about 480 mmHg or 740 mmHg, respectively. It can be expected that the generation of impurity gases is completed after about 8 hours at 200° C. or 14 hours at 150° C., but is continued even after 48 hours at 50° C. or 100° C.

FIG. 4 is a bar graph showing the weight increase (W1–W0) of the weight of the test containers containing the activated carbon after 48 hours in FIG. 3 W1 against the initial weight of the test containers containing the activated carbon W0. The weight increase suggested that the preliminary arsine and impurity atoms of oxygen, nitrogen and hydrogen bonded on the pore surface of sample 2 were subjected to a substitution reaction, and the arsine was irreversibly bonded on the pore surface by chemical adsorption to increase the weight. In the case where the heating temperature was 50° C. or 100° C., the weight increase of the latter was larger by about 50% than the former. In the case where the heating temperature was 150° C. or 200° C., the values of weight increase were substantially the same as each other, which was about three times larger than that of 50° C., i.e., a considerable increase from 50° C. was observed. It is expected from these results that in the case where the heating temperature is 150° C. or 200° C., the impurity atoms on the pore surface substantially react with the preliminary arsine to be substituted with arsine.

In the relationship to the adsorption step of arsine (phosphine) to be stored, FIG. 5 is a graph showing the change in purity of the arsine to be stored when the arsine to be stored is introduced into the test containers after conducting the pre-treatment according to the invention at various heating temperatures. The arsine to be stored was introduced at a temperature of 20° C. and a pressure of 400 mmHg, and allowed to stand at 35° C. The purity of arsine was calculated by obtaining the total amount of impurities of hydrogen, oxygen, nitrogen, methane, carbon monoxide and carbon dioxide.

It was clear from FIG. 5 that in the case where the pre-treatment was not conducted or was conducted at 50° C. or 100° C., the purity became lower than the required purity 99.9% after about 2 weeks, about 4 weeks and about 7 weeks, respectively, i.e., totally after several weeks. In the case of 150° C. or 200° C., on the other hand, such a rate of decrease in purity was not observed. It is expected from the proceeding of the rate of decrease in purity that the purity in the case of 150° C. or 200° C. does not become lower than 99.9%. Therefore, FIG. 5 indicates that when the preliminary arsine is heated to 150° C. to pre-treat the activated carbon, arsine to be stored can be preserved or stored for a long period of time without inclusion of impurities in the stored arsine.

FIG. 6 is a graph similar to FIG. 5 where phosphine is used, which indicates that, although the rate of decrease in purity is lower than the case of arsine, the preliminary phosphine must be heated to a temperature of 150° C. to 200° C. to realize the long term preservation or storage as similar to the case of arsine.

EXAMPLE 3

In Example 3, arsine was adsorbed to sample 2 prepared in Example 1 and general coconut shell activated carbon for gas adsorption, and the adsorbed amounts of arsine were measured. The results are shown in Table 4.

TABLE 4

| Arsine pressure (Torr) | Adsorbed amount of arsine (g) | |
| --- | --- | --- |
| | Sample 2 | Coconut shell activated carbon |
| 10 | 93 | 64 |
| 20 | 116 | 77 |
| 30 | 131 | 88 |
| 40 | 143 | 97 |
| 50 | 153 | 104 |
| 100 | 189 | 126 |
| 200 | 234 | 158 |
| 300 | 265 | 178 |
| 400 | 290 | 198 |
| 500 | 310 | 210 |
| 600 | 328 | 225 |
| 700 | 344 | 234 |

As shown in Table 4, sample 2 falling within the scope of the activated carbon used in the invention exhibited excellent results in comparison to the general coconut shell activated carbon for gas adsorption.

EXAMPLE 4

By using the apparatus for gas storage shown in FIG. 1, the weight of the apparatus W1 and the weight after adsorbing arsine under conditions of 20° C. and 700 mmHg W2 were measured according to the measurement methods of adsorbed arsine and released arsine. The pressure was gradually reduced to 20 mmHg in the similar operation, and the weight when the weight became constant W3 was measured. Thereafter, heating was conducted, and the weight Wn was measured at a temperature of 35° C., 50° C., 100° C. and 150° C., where n was 4, 5, 6, and 7 in this order. The results are shown in Table 5.

TABLE 5

| Heating temperature (° C.) | Remaining arsine (g) W2-Wn | Released arsine (g) Wn-W1 | Releasing ratio (%) (Wn-W1)/(W2-W1) |
| --- | --- | --- | --- |
| 20 (not heated) | 105 | 155 | 59.6 |
| 35 | 90 | 170 | 65.4 |
| 50 | 79 | 181 | 69.6 |

TABLE 5-continued

| Heating temperature (° C.) | Remaining arsine (g) W2-Wn | Released arsine (g) Wn-W1 | Releasing ratio (%) (Wn-W1)/(W2-W1) |
| --- | --- | --- | --- |
| 100 | 57 | 203 | 78.1 |
| 150 | 46 | 214 | 82.3 |

Name of gas: arsine
Volume of container: 1 L
Total amount of gas (W2-W1): 260 g
Pressure when releasing is completed: 20 mmHg It is clear from Table 5 that by heating to a suitable temperature, the amount of arsine obtained can be greatly increased, and effective utilization of the stored arsine can be realized.

EXAMPLE 5

By using the apparatus for gas storage shown in FIG. 1, the weight of the apparatus W1 and the weight after adsorbing phosphine under conditions of 20° C. and 700 mmHg W2 were measured according to the measurement methods of adsorbed phosphine and released phosphine. The pressure was gradually reduced to 20 mmHg in the similar operation, and the weight when the weight became constant W3 was measured. Thereafter, heating was conducted, and the weight Wn was measured at a temperature of 35° C., 50° C., 100° C. and 150° C., where n was 4, 5, 6, and 7 in this order. The results are shown in Table 6.

TABLE 6

| Heating temperature (° C.) | Remaining phosphine (g) W2-Wn | Released phosphine (g) Wn-W1 | Releasing ratio (%) (Wn-W1)/(W2-W1) |
| --- | --- | --- | --- |
| 20 (not heated) | 24 | 56 | 70.0 |
| 35 | 19 | 61 | 76.3 |
| 50 | 16 | 64 | 80.0 |
| 100 | 11 | 69 | 86.3 |
| 150 | 8 | 72 | 90.0 |

Name of gas: phosphine
Volume of container: 1 L
Total amount of gas (W2-W1): 80 g
Pressure when releasing is completed: 20 mmHg It is clear from Table 6 that by heating to a suitable temperature, the amount of phosphine obtained can be greatly increased, and effective utilization of the stored phosphine can be realized.

As described in detail, according to the activated carbon of the invention, the gaseous compound, such as arsine, phosphine and boron trifluoride, used as an ion implantation gas in the semiconductor industry for example, that has been adsorbed can easily be desorbed by a pressure difference. The problem having occurred at this time, i.e., the autolysis during storage increasing the storage circumstances lower than the atmospheric pressure to more than the atmospheric pressure, can be prevented. Therefore, when the gaseous compound, such as arsine, phosphine and boron trifluoride, used as an ion implantation gas in the semiconductor industry for example, is delivered to other working circumstances, a high purity gaseous compound can be delivered without leakage of a toxic gas to an environmental circumstances at the atmospheric pressure by drawing to a negative pressure.

Furthermore, the desorption temperature of the adsorbed gaseous compound, such as arsine, phosphine and boron trifluoride, are made a high temperature to increase the desorbed amount of the gaseous compound, and thus it is possible to increase the proportion of the gaseous compound that can be taken out while maintaining the inner pressure of the storage circumstances at a pressure lower than the atmospheric pressure.

By using the activated carbon having been subjected to the series of steps comprising an adsorbing step of previously adsorbing a gaseous hydrogenated compound and a gaseous halogenated compound by contacting in a sealed space, a step of accelerating an adsorption reaction of the system through the adsorption reaction, and an expelling step of expelling the gaseous compound through the reaction accelerating step from the sealed space, the deterioration of the purity of the stored gaseous compound due to impurity gases generated by the contact of the activated carbon and the stored gaseous compound at the time of storage is prevented, and the gaseous compound, such as arsine, phosphine and boron trifluoride, having an extremely high purity can be supplied.

The activated carbon of the invention can adsorb 36 g or more of arsine when the activated carbon is packed in a test container made of stainless steel having an inner volume of 100 ml, the interior of the test container is connected to a vacuum pump to be drawn to vacuum to a pressure of 0.01 mmHg, the test container is gradually heated from the outside to a temperature of the interior of the test container of 350° C., the interior of the test container is drawn to vacuum to a pressure of 0.01 mmHg, followed by allowed to cool to ordinary temperature, and arsine is introduced to a level that no more arsine can be adsorbed while the test container is maintained at a constant temperature of 20° C. by an incubator and the inner pressure of arsine in the test container is controlled to 700 mmHg, which is lower than the atmospheric pressure. That is, because the activated carbon of the invention can extremely effectively adsorb arsine, it can be preferably used as activated carbon used by being packed in a container such as a container that can store a gaseous compound and can effectively desorb the gaseous compound at a location where the gaseous compound is used.

By using the activated carbon of the invention, when a cylinder containing the activated carbon after adsorption of arsine is stored for 20 days with maintaining at 20° C. under the condition that there is no leakage from the cylinder, the inner pressure of the cylinder maintains about 100% as the initial pressure is designated 100%. That is, because the activated carbon of the invention can extremely stably store arsine in comparison to the conventional activated carbons it can be preferably used as activated carbon used by being packed in a container such as a container that can store a gaseous compound and can effectively desorb the gaseous compound at a location where the gaseous compound is used.

After the activated carbon of the invention having adsorbed arsine of a concentration of 100.0% is stored for 30 days with maintaining at 20° C. under the condition that there is no leakage from the cylinder, the purity of arsine exhibits 99.9% upon measurement. That is, because the activated carbon of the invention can extremely stably store arsine in comparison to the conventional activated carbon , it can be preferably used as activated carbon used by being packed in a container such as a container that can store a gaseous compound and can effectively desorb the gaseous compound at a location where the gaseous compound is used.

What is claimed is:

1. A process for storing and delivering a gas comprising a step of contacting a prescribed amount of a gaseous hydrogenated compound or a gaseous halogenated compound with activated carbon to store said gaseous compound by adsorption on said activated carbon at a pressure lower than the atmospheric pressure; and a step of desorbing at least a part of said gaseous compound, once adsorbed, from said activated carbon by withdrawing to a negative pressure to deliver said gaseous compound, wherein said activated carbon comprises a granular carbon formed body consisting of carbonized and activated grains of phenol resin powder bound to each other, and has a specific surface area of from about 700 to about 1,500 m$^2$/g, a pore volume of pores having a pore diameter of 10 nm or less of from about 0.20 to about 0.80 cc/g, a proportion of a pore volume of pores having a pore diameter of from about 0.6 to about 0.8 nm to a pore volume of pores having a pore diameter of 10 nm or less of 75% by volume or more, a grain bulk density of from about 0.4 to about 1.1 g/cc, a packing density of from 0.30 to 0.70 g/cc, an ash content of 1.0% or less, and a tensile strength of activated carbon grains of 30 kg/cm2 or more.

2. A process for storing and delivering a gas as claimed in claim 1, wherein said activated carbon is heated when at least a part of said gaseous compound is desorbed and delivered.

3. A process for storing and delivering a gas as claimed in claim 1, wherein said gaseous compound is selected from arsine, phosphine and boron trifluoride.

4. A process for storing and delivering a gas comprising a step of contacting a prescribed amount of a gaseous hydrogenated compound or a gaseous halogenated compound with activated carbon to store said gaseous compound by adsorption on said activated carbon at a pressure lower than the atmospheric pressure; and a step of desorbing at least a part of said gaseous compound, once adsorbed, from said activated carbon by withdrawing to a negative pressure to deliver said gaseous compound, wherein said activated carbon has been treated by an adsorbing step of adsorbing said gaseous hydrogenated compound or said gaseous halogenated compound to be stored and delivered on said activated carbon by contacting therewith in a sealed space; a reaction accelerating step of reacting said gaseous compound with said activated carbon; and an expelling step of expelling an impurity gas formed in said reaction accelerating step from said sealed space.

5. A process for storing and delivering a gas as claimed in claim 4, wherein said activated carbon comprises a granular carbon formed body consisting of carbonized and activated grains of phenol resin powder bound to each other, and has a specific surface area of from about 700 to about 1,500 m$^2$/g, a pore volume of pores having a pore diameter of 10 nm or less of from about 0.20 to about 0.80 cc/g, a proportion of a pore volume of pores having a pore diameter of from about 0.6 to about 0.8 nm to a pore volume of pores having a pore diameter of 10 nm or less of 75% by volume or more, a grain bulk density of from about 0.4 to about 1.1 g/cc, a packing density of from 0.30 to 0.70 g/cc, an ash content of 1.0% or less, and a tensile strength of activated carbon grains of 30 kg/cm$^2$ or more.

6. A process for storing and delivering a gas as claimed in claim 4, wherein said sealed space is heated in said reaction accelerating step.

7. A process for storing and delivering a gas as claimed in claim 4, wherein a supplied amount of said gaseous compound and a temperature in said sealed space are so adjusted that a pressure inside said sealed space in said reaction accelerating step is lower than the atmospheric pressure.

8. A process for storing and delivering a gas as claimed in claim 4, wherein a supplied amount of said gaseous compound and a temperature in said sealed space are so adjusted that a pressure inside said sealed space in said expelling step is lower than the atmospheric pressure.

9. A process for storing and delivering a gas as claimed in claim 4, wherein a buffer space is provided in said sealed space.

10. Activated carbon for adsorptive storage of a gaseous compound having a specific surface area of from about 700 to about 1,500 $m^2/g$, a pore volume of pores having a pore diameter of 10 nm or less of from about 0.20 to about 0.80 cc/g, a proportion of a pore volume of pores having a pore diameter of from about 0.6 to about 0.8 nm to a pore volume of pores having a pore diameter of 10 nm or less of 75% by volume or more, a grain bulk density of from about 0.4 to about 1.1 g/cc, a packing density of from about 0.30 to about 0.70 g/cc, an ash content of 1.0% or less, and a tensile strength of activated carbon grains of 30 $kg/cm^2$ or more.

11. Activated carbon for adsorptive storage of a gaseous compound capable of storing and then delivering a gaseous hydrogenated compound or a gaseous halogenated compound as claimed in claim 10, wherein said activated carbon
by contacting with a prescribed amount of a gaseous hydrogenated compound or a gaseous halogenated compound, adsorbs and stores said gaseous compound at a pressure lower than the atmospheric pressure, and
obtains said gaseous compound by desorbing at least a part of said gaseous compound and delivers the gaseous compound by withdrawing to a negative pressure.

12. Activated carbon for adsorptive storage of a gaseous compound as claimed in claim 11, wherein said activated carbon is heated when said at least a part of said gaseous compound is desorbed and delivered.

13. Adsorptive storage of a gaseous compound employing the activated carbon claimed in claim 10, by treating the activated carbon according to a series of steps comprising:
a step of adsorbing a gaseous hydrogenated compound and a gaseous halogenated compound by contact in a sealed space,
a step of accelerating adsorption by the activated carbon and accelerating chemical reaction of gas impurities with the activated carbon, and
a step of expelling said gaseous compound through said reaction accelerating step from said sealed space,
upon storage of a gaseous hydrogenated compound or a gaseous halogenated compound of the same kind of said gaseous compound or of different kind from said gaseous compound, said activated carbon being capable of preventing decrease in purity of said gaseous compound once stored, due to an impurity gas generated by the contact of said activated carbon and said gaseous compound to be stored.

14. Activated carbon for adsorptive storage of a gaseous compound as claimed in claim 10, wherein said activated carbon is one obtained from a phenol resin as a main raw material.

15. Activated carbon for adsorptive storage of a gaseous compound treated by a series of steps comprising
a step of adsorbing a gaseous hydrogenated compound and a gaseous halogenated compound by contact in a sealed space,
a step of accelerating adsorption by the activated carbon and accelerating chemical reaction of gas impurities with the activated carbon, and
a step of expelling said gaseous compound through said reaction accelerating step from said sealed space,
upon storage of a gaseous hydrogenated compound or a gaseous halogenated compound of the same kind of said gaseous compound or of different kind from said gaseous compound, said activated carbon being capable of preventing decrease in purity of said gaseous compound once stored, due to an impurity gas generated by the contact of said activated carbon and said gaseous compound to be stored.

16. Activated carbon for adsorptive storage of a gaseous compound as claimed in claim 15, wherein in said reaction accelerating step, an introduced amount of a prescribed amount of said gaseous hydrogenated compound or said gaseous halogenated compound and/or a heating temperature in said sealed space is selected.

17. Activated carbon for adsorptive storage of a gaseous compound as claimed in claim 15, wherein an introduced amount of a prescribed amount of said gaseous hydrogenated compound or said gaseous halogenated compound and/or a heating temperature in said sealed space is so selected that said sealed space in said expelling step has a pressure lower than the atmospheric pressure.

18. Activated carbon for adsorptive storage of a gaseous compound capable of storing and then delivering a gaseous hydrogenated compound or a gaseous halogenated compound as claimed in claim 15, wherein said activated carbon by contacting with a prescribed amount of a gaseous hydrogenated compound or a gaseous halogenated compound, adsorbs and stores said gaseous compound at a pressure lower than the atmospheric pressure, and obtains said gaseous compound by desorbing at least a part of said gaseous compound and delivers the gaseous compound by withdrawing to a negative pressure.

19. Activated carbon for adsorptive storage of a gaseous compound as claimed in claim 18, wherein said activated carbon is heated when said at least a part of said gaseous compound is desorbed and delivered.

20. Activated carbon for adsorptive storage of a gaseous compound as claimed in claim 15, wherein said activated carbon is one obtained from a phenol resin as a main raw material.

* * * * *